United States Patent
Park et al.

(10) Patent No.: US 8,432,606 B2
(45) Date of Patent: Apr. 30, 2013

(54) ELECTROPHORETIC DISPLAY DEVICE AND METHOD OF FABRICATING THE SAME

(75) Inventors: Choon-Ho Park, Gyeonggi-Do (KR); Seung-Han Paek, Bucheon (KR); Sang-Il Shin, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 13/178,758

(22) Filed: Jul. 8, 2011

(65) Prior Publication Data

US 2012/0013968 A1 Jan. 19, 2012

(30) Foreign Application Priority Data

Jul. 14, 2010 (KR) ........................ 10-2010-0068127

(51) Int. Cl.
*G02B 26/00* (2006.01)
*G09G 3/34* (2006.01)

(52) U.S. Cl.
USPC ............. 359/296; 345/107; 345/690; 345/55; 345/204

(58) Field of Classification Search ............... 359/296, 359/252, 253; 345/55, 107, 204, 690; 438/28; 257/E33.056; 204/600; 445/24, 46; 315/169.3

See application file for complete search history.

(56) References Cited

U.S. PATENT DOCUMENTS

| | | | | |
|---|---|---|---|---|
| 7,075,502 B1 * | 7/2006 | Drzaic et al. | ..................... | 345/55 |
| 7,339,716 B2 * | 3/2008 | Ding et al. | ..................... | 359/296 |
| 7,355,784 B2 * | 4/2008 | Kim | .................. | 359/296 |
| 7,675,502 B2 * | 3/2010 | Chopra et al. | ................. | 345/107 |
| 7,760,419 B2 * | 7/2010 | Lee | .................. | 359/296 |
| 7,952,558 B2 * | 5/2011 | Yang et al. | ..................... | 345/107 |
| 2010/0134407 A1 * | 6/2010 | Wang et al. | .................... | 345/107 |
| 2011/0025681 A1 * | 2/2011 | Komatsu et al. | ............... | 345/214 |

* cited by examiner

*Primary Examiner* — Loha Ben
(74) *Attorney, Agent, or Firm* — McKenna, Long & Aldridge, LLP.

(57) ABSTRACT

Disclosed is an electrophoretic display (EPD) device capable of implementing colors with high brightness. Each sub-pixel implement colors with driving color particles, white particles and black particles, and the EPD device has an enhanced contrast ratio due to black particles.

27 Claims, 9 Drawing Sheets

ELECTROPHORETIC DISPLAY DEVICE AND METHOD OF FABRICATING THE SAME

This application claims the benefit of Korean Patent Application No. 10-2010-0068127, filed on Jul. 14, 2010, which is hereby incorporated by reference for all purposes as if fully set forth herein.

BACKGROUND OF THE INVENTION

1. Field of the Invention

The present invention relates to an electrophoretic display (EPD) device and a method for fabricating the same, and more particularly to an EPD device with enhanced brightness and contrast ratio, reduced fabrication costs and short fabrication time, and a method for fabricating the same.

2. Discussion of the Related Art

An electrophoretic display (EPD) device is an image display device using a phenomenon that colloidal particles move to either one of the polarities when one pair of electrodes to which a voltage is applied are immersed into a colloidal solution. Compared to a liquid crystal display (LCD) device, such an EPD device has the advantages of wide viewing angle, high reflectivity, low power consumption, and the like, without using a backlight. It is thus expected to be widely used as a flexible display such as an electronic paper.

An EPD device has a structure in which an electrophoretic layer is interposed between two substrates. One of the two substrates is made of a transparent substrate and the other substrate is provided with an array of driving elements to display images in a reflective mode in which light entering from the outside of the device is reflected.

FIG. 1 is a view illustrating an EPD device 1 in accordance with the related art. As illustrated in FIG. 1, the EPD device 1 may include a first substrate 20 and a second substrate 40, thin-film transistors and a pixel electrode 18 formed on the first substrate 20, a common electrode 42 formed on the second substrate 40, an electrophoretic layer 60 formed between the first substrate 20 and the second substrate 40, and an adhesive layer 56 formed between the electrophoretic layer 60 and the pixel electrode 18.

The thin-film transistor may include a gate electrode 11 formed on the first substrate 20, a gate insulation layer 22 formed over the first substrate 20 having the gate electrode 11, a semiconductor layer 13 formed on the gate insulation substrate 22, and a source electrode 15 and a drain electrode 16 formed on the semiconductor layer 13. A passivation layer 24 is formed on the source electrode 15 and drain electrode 16 of the thin-film transistor.

The pixel electrode 18 is formed on the passivation layer 24 to apply a signal to the electrophoretic layer 60. A contact hole 28 is formed on the passivation layer 24, and the pixel electrode 18 is connected to the drain electrode 16 of the thin-film transistor through the contact hole 28.

A color filter layer 44 and a common electrode 42 are formed on the second substrate 40. The electrophoretic layer 60 is formed on the color filter layer 44 and the adhesive layer 56 is formed on the electrophoretic layer 60. The electrophoretic layer 60 may include a capsule 70 filled with white particles 74 and black particles 76 therein. When a signal is applied to the pixel electrode 18, then an electric field is generated between the common electrode 42 and the pixel electrode 18, and white particles 74 and black particles 76 inside the capsule 70 move in a direction of either the common electrode 42 or pixel electrode 18 by the electric field, thereby displaying an image.

For example, when a negative (−) voltage is applied to the pixel electrode 18 on the first substrate 20 and a positive (+) voltage is applied to the common electrode 42 on the second substrate 40, positively charged (+) white particles 74 are moved to the side of the first substrate 20 and negatively charged (−) black particles 76 are moved to the side of the second substrate 40. In this state, if light is incident from the outside, i.e., an upper portion of the second substrate 40, then the incident light is reflected from the black particles 76, thereby implementing a black color on the EPD device.

On the contrary, when a positive (+) voltage is applied to the pixel electrode 18 on the first substrate 20 and a negative (−) voltage is applied to the common electrode 42 on the second substrate 40, positively charged (+) white particles 74 are moved to the side of the second substrate 40 and negatively charged (−) black particles 76 are moved to the side of the first substrate 20. In this state, if light is incident from the outside, i.e., an upper portion of the second substrate 40, then the incident light is reflected from the white particles 74, thereby implementing a white color on the EPD device.

However, the EPD device 1 having the foregoing structure according to the related art may have the following problems.

First, the method of fabricating the EPD device according to the related art has difficulty in attaching the first substrate and the second substrate to each other.

In the EPD device according to the related art, the first substrate 20 and second substrate 40 are individually fabricated, and then the first substrate 20 and second substrate 40 are attached to each other by the adhesive layer 56 to complete the process. In other words, a thin-film transistor for driving a unit pixel and the pixel electrode 18 for applying an electric field to the electrophoretic layer are formed on the first substrate 20, and the common electrode 42, the color filter layer 44, the electrophoretic layer 60 and the adhesive layer 56 are formed on the second substrate 40. Then, the first substrate 20 and the second substrate 40 are attached to each other to complete the fabrication process.

However, the unit pixel of the EPD device is typically formed with a small size less than 150 micrometer in the height and width thereof, and thus it may be difficult to accurately align the electrophoretic layer with the unit pixel. If the electrophoretic layer is not accurately aligned with the first substrate formed with a thin-film transistor, then an electric field is not accurately delivered to electrophoretic particles, thereby causing a driving error.

Second, the method of fabricating the EPD device according to the related art has a complicated fabrication process.

The first substrate 20 and the second substrate 40 are separately fabricated through different processes and transferred by a transfer means to be attached to each other in an attachment process, and thus it may be difficult to utilize an in-line fabrication process.

Third, electrostatic discharge generated during the process of attaching the first substrate 20 and second substrate 40 may cause failure in the initial alignment of electrophoretic particles.

As discussed above, the common electrode 42, the color filter layer 44 and the electrophoretic layer 60 are formed on the second substrate 40, and the adhesive layer 56 is coated on the electrophoretic layer 60. A protection film is typically attached to the adhesive layer 56 in order to prevent the reduction of the adhesive force of the adhesive layer 56 and prohibit foreign materials from being adhered to the adhesive layer 56. However, the protection film should be peeled off from the second substrate 40 before being attached to the first substrate 20. In this case, electrostatic discharge generated during the process of peeling off the protection film may cause misalignment in the initial alignment of electrophoretic particles. The misalignment of electrophoretic particles may generate a moire defect with a comb-tooth-shaped pattern during the operation of the EPD device.

Fourth, the EPD device according to the related has a deteriorated brightness and contrast ratio.

In the EPD device according to the related art, the color filter layer 44 is typically formed on the second substrate 40 so as to implement colors. Colors are implemented as the light reflected from the white particles 74 passes through the color filter layer 44.

In case of using the color filter layer 44, light passes through the color filter layer 44 two times: once when being incident onto the white particles 74 from the outside, and the other when being emitted to the outside after being reflected from the white particles 74. Accordingly, the brightness of the EPD device is lowered due to an absorption of light by the color filter layer 44.

For instance, when light passes through the color filter layer 44, about 46% of the light is absorbed. As a result, about 7.7% of the light incident from the outside is emitted to the outside after it passes through the color filter layer 44 and the electrophoretic layer 60, which greatly reduces the brightness of the EPD device.

SUMMARY OF THE INVENTION

Accordingly, the present invention is directed to an electrophoretic display (EPD) device and method for fabricating the same that substantially obviates one or more of the problems due to limitations and disadvantages of the related art.

An advantage of the present invention is to provide an electrophorectic display device without a color filter layer that can realize colors with high brightness and contrast ratio, and a method for fabricating the same.

Another advantage of the present invention is to provide an electrophoretic display device capable of enhancing a contrast ratio by displaying a black color of higher clarity, and a method for fabricating the same.

Still another advantage of the present invention is to provide an electrophoretic display device capable of reducing the fabrication costs and simplifying the fabrication process by directly forming an electrophoretic layer on a substrate where thin film transistors (TFTs) are formed, and a method for fabricating the same.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, an electrophoretic display (EPD) device may include first and second substrates having a plurality of unit pixels, each unit pixel including three sub-pixels; a thin film transistor in each sub-pixel on the first substrate; a pixel electrode connected to a drain electrode of the thin film transistor; an electrophoretic layer on the pixel electrode, the electrophoretic layer including white charged particles, black charged particles and color charged particles; and a common electrode on the second substrate.

In another aspect of the present invention, a method of manufacturing an electrophoretic display (EPD) device, the EPD device having a plurality of unit pixels, each unit pixel including three sub-pixels, the method may include forming a thin film transistor in each sub-pixel on a first substrate; forming a passivation layer on the thin film transistor; forming a contact hole in the passivation layer; forming a pixel electrode on the passivation layer, the pixel electrode being connected to a drain electrode of the thin film transistor via the contact hole; forming a partition wall between the sub-pixels, the partition wall substantially surrounding the pixel electrode in each sub-pixel; forming an electrophoretic layer on the pixel electrode, the electrophoretic layer including white charged particles, black charged particles and color charged particles; and attaching the first substrate to a second substrate.

In yet another aspect of the present invention, an electrophoretic display (EPD) device includes first and second substrates having a plurality of unit pixels, each unit pixel including four sub-pixels; a thin film transistor in each sub-pixel on the first substrate; a pixel electrode connected to a drain electrode of the thin film transistor; a partition wall between the sub-pixels substantially surrounding the pixel electrode in each sub-pixel; an electrophoretic layer on the pixel electrode, wherein each electrophoretic layer in the three sub-pixels includes white charged particles and color charged particles, and wherein the electrophoretic layer in the residual sub-pixel includes either the white charged particles or black charged particles; and a common electrode on the second substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Figure 1:
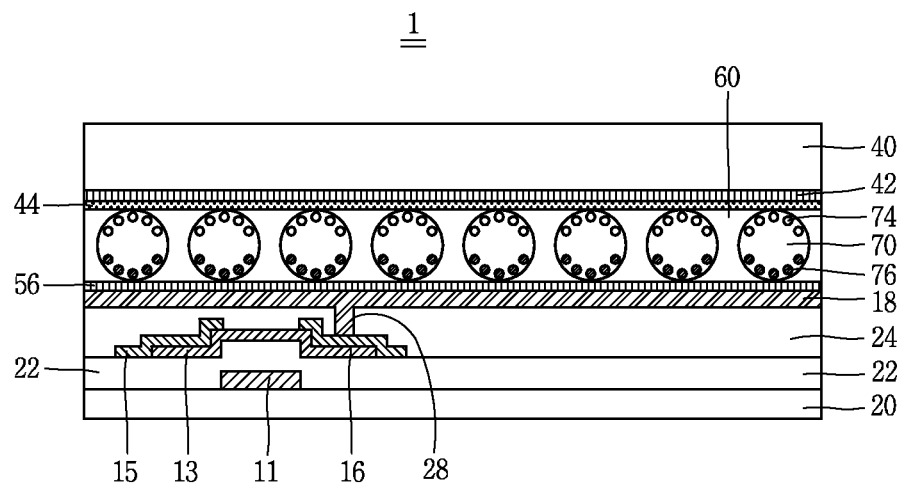
FIG. 1 is a cross-sectional view illustrating an electrophoretic display device in accordance with the related art.

Reference will now be made in detail to embodiments of the present invention, examples of which are illustrated in the accompanying drawings. For the sake of brief description, the same reference numbers may be used throughout the drawings to refer to the same or like parts, and description thereof may be omitted.

Hereinafter, an electrophoretic display (EPD) device according to the present invention will be explained in more detail with reference to the attached drawings.

Some terms of the present invention will be explained. In the present invention, a unit pixel includes three sub-pixels. The sub-pixels are defined by partition walls, and each includes a space defined by the partition walls. A first substrate is a substrate on which switching devices such as thin film transistors (TFTs) are formed, which is also called as an array substrate.

In the present invention, an electrophoretic layer is formed on the first substrate on which TFTs are formed. That is, an electrophoretic layer is formed after TFTs have been fabricated. This consecutive fabrication method of the present invention can simplify the fabrication processes as compared with the fabrication method according to the related art.

In the fabrication method according to the related art, an electrophoretic layer has to be provided from another factory or another company, and then has to be transferred to a factory where TFTs are fabricated. Then, the electrophoretic layer has to be attached to the first substrate. This may cause fabrication processes to be delayed and complicated. Furthermore, when transferring the second substrate by a transferring means such as a vehicle, the second substrate may be damaged.

On the other hand, in the present invention, an electrophoretic layer is formed on the first substrate after TFTs have been fabricated. This may allow an EPD device to be fabricated more rapidly.

In the present invention, colors are realized by filling charged color particles in each sub-pixel, without forming a color filter layer. This may prevent lowering of the brightness. More specifically, the color EPD device according to the related art is provided with a color filter layer on the second substrate. Accordingly, an amount of the light emitted from the EPD device decreases when an external light passes through the color filter layer, thereby lowering the brightness. However, in the present invention, no color filter layer is provided so that lowering of the brightness due to a color filter layer may be prevented. Here, the color particles are implemented, for example, as cyan, magenta and yellow color particles, or red, green and blue (RGB) color particles. By combining colors reflected from these color particles with each other, black, white and other colors may be realized. In the present invention, each sub-pixel is also provided with color particles and black particles. This may allow a black color to be displayed with a higher clarity, thereby enhancing the contrast ratio of the EPD device. Herein, the color particles and the black particles are charged with the same type of charges.

Figure 2:
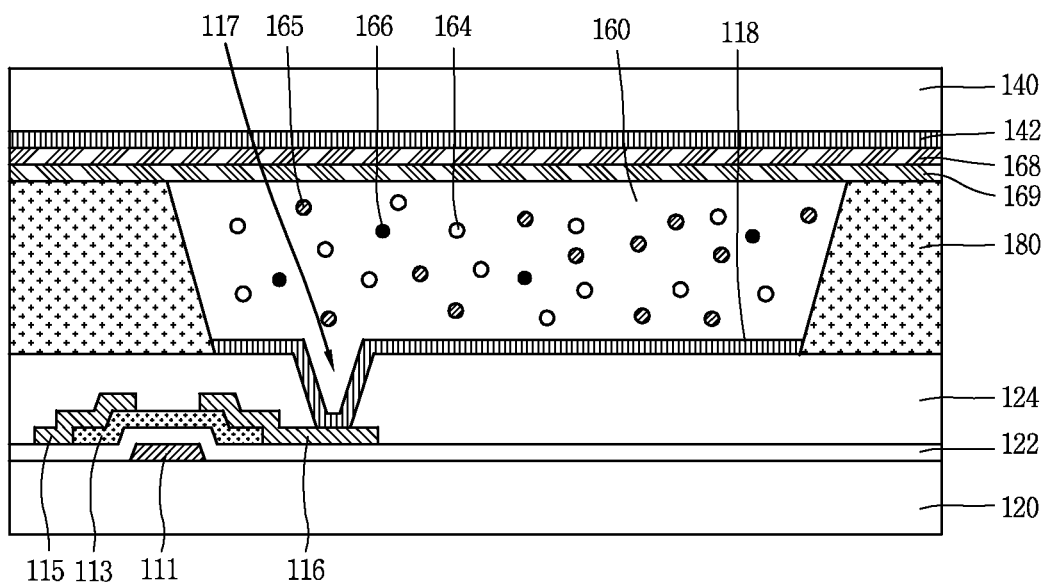
FIG. 2 is a cross-sectional view illustrating a structure of a sub-pixel of an electrophoretic display device according to the first embodiment of the present invention

FIG. 2 is a cross-sectional view illustrating a structure of a sub-pixel of an EPD device according to the first embodiment of the present invention. In the EPD device, a plurality of sub-pixels of cyan, magenta and yellow, or a plurality of sub-pixels of red, green and blue (RGB) are repeatedly arranged. However, only one sub-pixel will be hereinafter explained for convenience. The sub-pixels of cyan, magenta and yellow, or the sub-pixels of RGB constitute a unit pixel.

As illustrated in FIG. 2, the EPD device includes a first substrate 120 having a display region where a plurality of sub-pixels are arranged and a non-display region formed on an outer periphery of the display region, a second substrate 140 corresponding to the first substrate 120, a thin film transistor (TFT) formed on each sub-pixel on the first substrate 120, a passivation layer 124 formed on the first substrate 120 where the TFTs have been formed, a pixel electrode 118 formed on each sub-pixel on the passivation layer 124, a partition wall 180 formed between the sub-pixels on the passivation layer 124, an electrophoretic layer 160 filled in each sub-pixel defined by the partition wall 180, and a common electrode 142 formed on the second substrate 140. Herein, the electrophoretic layer 160 includes white particles, color particles and black particles. The EPD device may further include a sealing layer 168 formed on the electrophoretic layer 160 that is configured to seal an electrophoretic material of the electrophoretic layer 160 and prevent moisture from being introduced into the electrophoretic layer 160.

The thin film transistor (TFT) includes a gate electrode 111 formed on the first substrate 120, a gate insulation layer 122 formed on the gate electrode 111, a semiconductor layer 113 disposed on the gate insulation layer 122 and formed of a semiconductor material such as an amorphous silicon (a-Si), and a source electrode 115 and a drain electrode 116 formed on the semiconductor layer 113.

The passivation layer 124 may be formed of an organic insulation material such as BCB (Benzo Cyclo Butene) or photo acryl, and the passivation layer 124 above the drain electrode 116 of the TFT is provided with a contact hole 117. Through the contact hole 117, the pixel electrode 118 formed on the passivation layer 124 is electrically connected to the drain electrode 116 of the TFT.

The partition wall 180 may be formed of a photosensitive organic insulation material. The sub-pixels defined by the partition wall 180 are filled with the electrophoretic layer 160 therein. The electrophoretic layer 160 includes positively charged white particles 164, negatively charged color particles 165, and negatively charged black particles 166. The color particles 165 may be implemented as color particles of cyan, magenta and yellow, or color particles of RGB.

The white particles 164 implement a white color. More specifically, when a voltage is applied to a space between the pixel electrode 118 and the common electrode 142, the charged white particles 164 are moved toward the second substrate 140. In this case, light incident from the outside of the second substrate 140 is reflected from the white particles 164, thereby implementing a white color on the screen of the EPD device.

The color particles of cyan, magenta and yellow, or the color particles 165 of RGB realize colors. More specifically, when a voltage is applied to a space between the pixel electrode 118 and the common electrode 142, the negatively charged color particles 165 are moved toward the second substrate 140. In this case, light incident from the outside of the second substrate 140 is reflected from the color particles 165, thereby implementing colors. In the EPD device, a cyan sub-pixel, a magenta sub-pixel and a yellow sub-pixel are sequentially arranged, or a red sub-pixel, a green sub-pixel and a blue sub-pixel are sequentially arranged, thereby implementing the respective color on the sub-pixel. Also, a desired color may be implemented through combinations of the colors.

The color particles 165 of cyan, magenta and yellow may implement a black color by being combined with one another. That is, when a voltage is applied to a space between the pixel electrode 118 and the common electrode 142, the color particles 165 of cyan, magenta and yellow are moved toward the second substrate 140. In this case, the three colors of cyan, magenta and yellow are combined with one another, thereby implementing a black color. In the present invention, the cyan sub-pixel, the magenta sub-pixel, and the yellow sub-pixel are provided with the black particles 166 together with the color particles 165, thereby displaying a black color with a higher clarity. The black particles 166 included in each of the cyan sub-pixel, the magenta sub-pixel and the yellow sub-pixel have a volume ratio of about 0.01-50 Vol. %, preferably 0.03-30 Vol. % with respect to each of the cyan, magenta and yellow color particles. If a volume ratio of the black particles 166 with respect to the color particles 165 is less than 0.01 Vol. %, an absorption rate of visible rays is lowered so that displaying a black color with a higher clarity becomes difficult. On the other hand, if a volume ratio of the black particles 166 with respect to the color particles 165 is more than 50 Vol. %, reflectivity of the color particles of cyan, magenta or yellow is lowered so that the visibility of a displayed color is degraded.

The electrophoretic layer includes a dispersive medium such as a liquid polymer. The dispersive medium includes the white particles 164, the color particles 165 and the black particles 166 dispersed therein. The white particles 164, the color particles 165 and the black particles 166 move in the dispersive medium by an applied voltage. The dispersive medium may include air. More specifically, air rather than the dispersive medium such as a liquid polymer may serve as a medium in which the white particles 164, the color particles 165 and the black particles 166 move by an applied voltage. The electrophoretic layer 160 may not include a dispersive medium. In this case, the white particles 164, the color particles 165 and the black particles 166 move in an electric field by an applied voltage, thereby implementing images.

In case of using a liquid polymer as the dispersive medium, a transparent liquid polymer may be used. The sealing layer 168 is configured to completely seal each sub-pixel. The sealing layer 168 may prevent the electrophoretic particles included in the electrophoretic layer 160 formed of dyes and having a low viscosity from flowing to adjacent sub-pixels when the first and second substrates are attached to each other. Also, the sealing layer 168 may prevent moisture from being introduced into the electrophoretic layer 160.

The sealing layer 168 may be formed on both an upper surface of the electrophoretic layer 160 and an upper surface of the partition wall 180. In this case, some of the charged electrophoretic particles may be electrically adhered to the sealing layer 168, resulting in an error in the initial arrangements of the electrophoretic particles. Accordingly, the sealing layer 168 may not be formed on an upper surface of the electrophoretic layer 160, but may be formed only on an upper surface of the partition wall 180.

In order to prevent the electrophoretic particles from being electrically adhered to the sealing layer 168, each sub-pixel may be filled with an electrophoretic material, and then an interlayer 169 may be formed on the electrophoretic layer. This may prevent the electrophoretic particles from directly contacting the sealing layer. In this case, the electrophoretic particles are prevented from being adhered to the sealing layer, thereby reducing the occurrence of deteriorated pixels.

The interlayer 169 may be formed of a photosensitive organic material like the material for the partition wall 180, or may be formed of Methyl Ethyl Ketone. The interlayer 169 is coated on upper surfaces of the electrophoretic layer 160 and the partition wall 180 with a thickness of several nanometers. The interlayer 169 may serve to facilitate formation of the sealing layer by temporarily sealing the electrophoretic layer, and may prevent the electrophoretic particles from being adhered to the sealing layer.

In FIG. 2, the first substrate 120 and the second substrate 140 are attached to each other by the sealing layer 168. However, an adhesive layer may be formed so as to enhance an adhesive strength between the first substrate 120 and the second substrate 140. The adhesive layer may be formed only on an outer periphery of the EPD device, i.e., the sealing layer 168 on the partition wall 180. Alternatively, the adhesive layer may be formed on the entire sealing layer 168.

The common electrode 142 is formed of a transparent conductive material such as ITO and IZO.

In the EPD device according to the present invention, the partition wall 180 is directly formed on the first substrate 120. The electrophoretic layer 160 is also directly formed on the pixel electrode 118 when an electrophoretic material is filled between the partition walls 180 of the first substrate 120, thereby directly contacting the pixel electrode 118. Accordingly, differently from the related art, additional adhesive layers for attaching the electrophoretic layer 160 to the pixel electrode 118 and the passivation layer 124 are not required in the present invention. This may simplify the fabrication processes and reduce the fabrication costs.

An EPD device according to the first embodiment of the present invention realizes colors by the light reflected from the color particles 165, which will be explained in more detail.

Figure 3A:
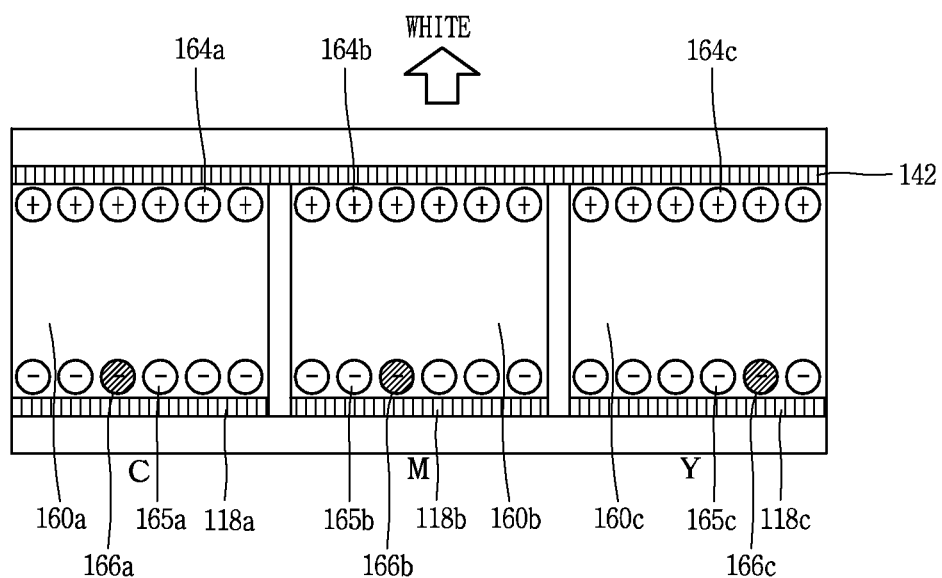
FIGS. 3A and 3B are views illustrating a method for implementing black and white colors on an electrophoretic display device according to the first embodiment of the present invention.
Figure 3B:
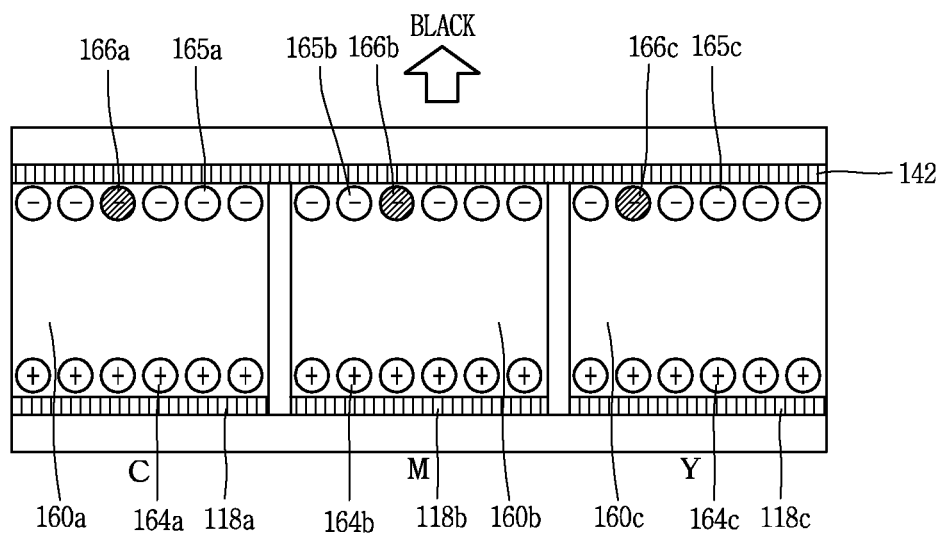

FIGS. 3A and 3B are views illustrating processes for implementing white and black colors by three sub-pixels of cyan, magenta and yellow in an EPD device where electrophoretic layers 160a~160c include white particles 164a~164c, color particles 165a~165c and black particles 166a~166c.

Referring to FIGS. 3A and 3B, the color particles 165a indicate cyan color particles which implement a highly saturated green-blue color, the color particles 165b indicate magenta color particles which implement a dark reddish-purple color, and the color particles 165c indicate yellow color particles which implement a yellow color. The white particles 164a~164c are positively charged, whereas the color particles 165a~165c and the black particles 166a~166c are negatively charged. Alternatively, the white particles 164a~164c may be negatively charged, whereas the color particles 165a~165c and the black particles 166a~166c may be positively charged.

Instead of the cyan color particles 165a, the magenta color particles 165b and the yellow color particles 165c, red color particles, green color particles and blue color particles may be used. Hereinafter, only the cyan color particles 165a, the magenta color particles 165b and the yellow color particles 165c will be explained for convenience.

As illustrated in FIG. 3A, a negative potential (−) is formed on a common electrode 142 of the second substrate 140 when a positive voltage (+) is applied to all of pixel electrodes 118a, 118b and 118c in the three sub-pixels of cyan, magenta and yellow. In this case, the positively charged (+) white particles 164 in the cyan sub-pixel (C), the magenta sub-pixel (M) and the yellow sub-pixel (Y) are moved toward the second substrate 140. At the same time, the color particles 165a, 165b and 165c, and the black particles 166a, 166b and 166c are moved toward the first substrate 120 in the cyan sub-pixel (C), the magenta sub-pixel (M) and the yellow sub-pixel (Y). Accordingly, when light is incident from an upper side of the second substrate 140, most of the incident light is reflected from the white particles 164. This may allow a white color to be implemented on the EPD device.

As illustrated in FIG. 3B, a positive potential (+) is formed on the common electrode 142 of the second substrate 140 when a negative voltage (−) is applied to all of the pixel electrodes 118a, 118b and 118c in the three sub-pixels of cyan, magenta and yellow. In this case, the positively charged (+) white particles 164 in the cyan sub-pixel (C), the magenta sub-pixel (M) and the yellow sub-pixel (Y) are moved toward the first substrate 120. At the same time, the color particles 165a, 165b and 165c, and the black particles 166a, 166b and 166c are moved toward the second substrate 140 in the cyan sub-pixel (C), the magenta sub-pixel (M) and the yellow sub-pixel (Y). Accordingly, when light is incident from the outside, light of a green-blue color, a dark reddish-purple color and a yellow color is output from the cyan color particles 165a, the magenta color particles 165b and the yellow color particles 165c, respectively. The combination of a green-blue color, a dark reddish-purple color and a yellow color typically results in a black color. Accordingly, a black color is implemented by applying a negative voltage (−) to the pixel electrodes 118a,118b and 118c and applying a positive voltage (+) to the common electrode 142 of the second substrate 140. Herein, the black particles 166a,166b and 166c are also moved toward the second substrate 140. Accordingly, visible rays incident from the outside of the second substrate 140 and the light reflected from the cyan color particles 165a, the magenta color particles 165b and the yellow color particles 165c are partially absorbed by the black particles 166a, 166b and 166c, thereby enhancing clarity (e.g., visibility) of the displayed black color.

Figure 4A:
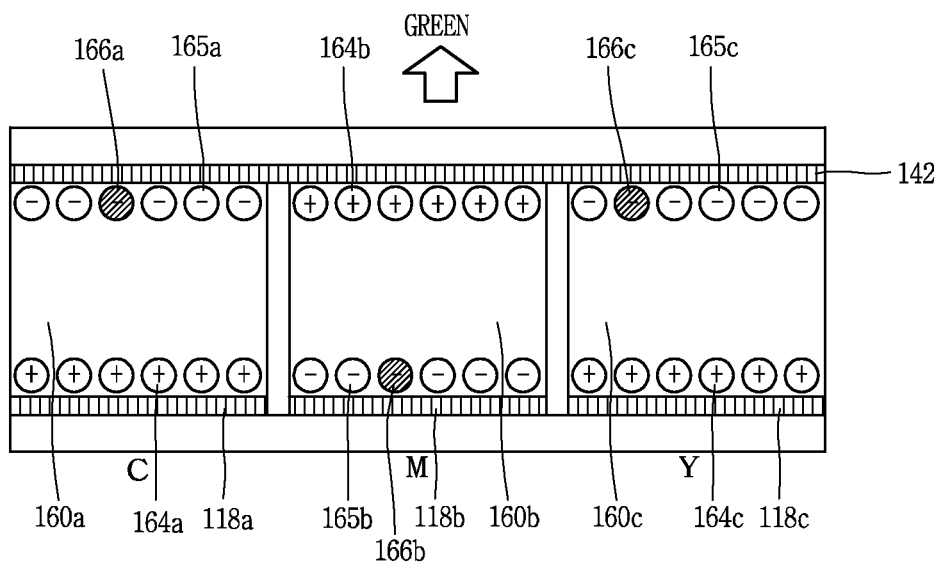
FIGS. 4A to 4C are views illustrating a method for implementing colors on an electrophoretic display device according to the first embodiment of the present invention.
Figure 4B:
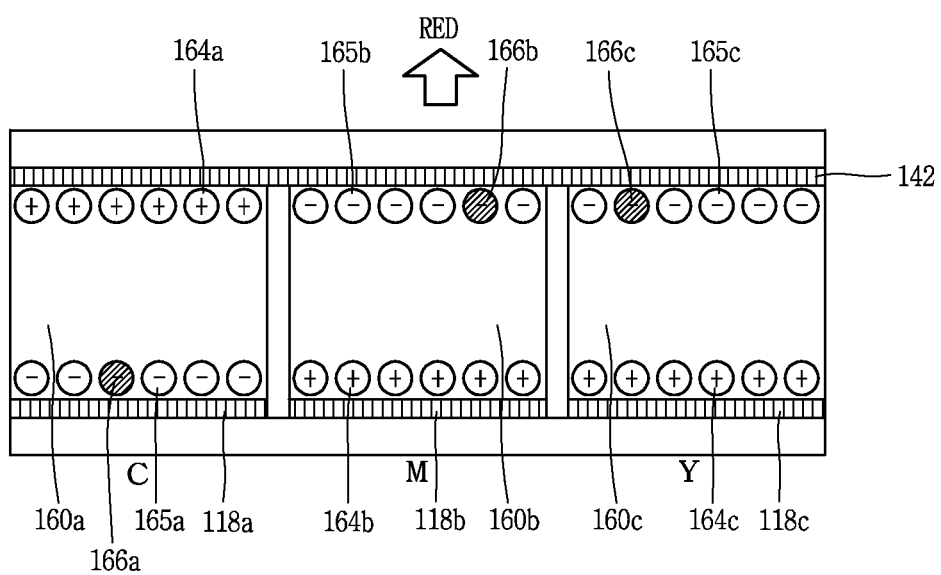
Figure 4C:
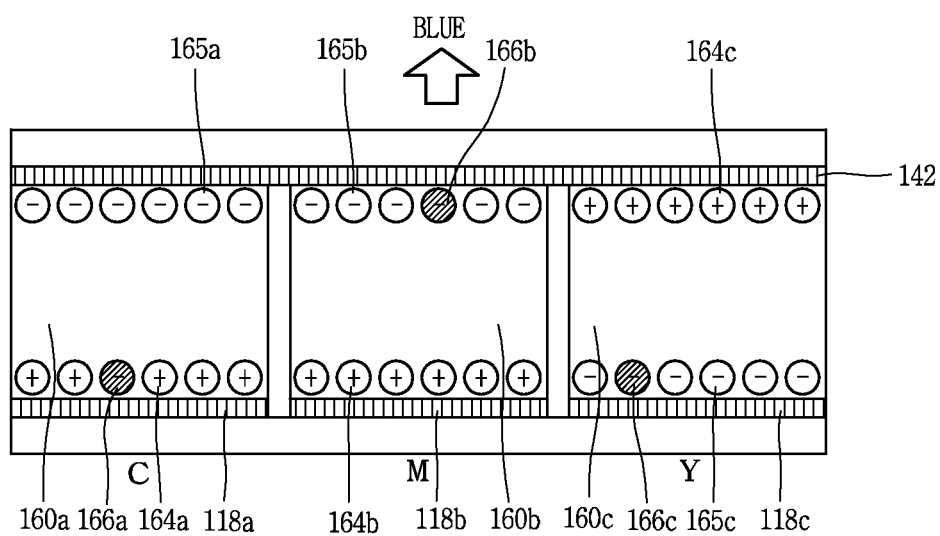

FIGS. 4A to 4C are views illustrating processes for realizing colors by the cyan color particles 165a, the magenta color particles 165b and the yellow color particles 165c filled in the cyan sub-pixel (C), the magenta sub-pixel (M) and the yellow sub-pixel (Y), respectively.

As illustrated in FIG. 4A, a negative voltage (−) is applied to the pixel electrodes 118a and 118c of the cyan and yellow sub-pixels, and a positive voltage (+) is applied to the pixel electrode 118b of the magenta sub-pixel. In this case, the positively charged (+) white particles 164a and 164c in the cyan sub-pixel and the yellow sub-pixel are moved toward the first substrate 120, and the negatively charged (−) cyan color particles 165a, yellow color particles 165c and black particles 166a and 166c are moved toward the second substrate 140. At the same time, the positively charged (+) white particles 164b in the magenta sub-pixel are moved toward the second substrate 140, and the negatively charged (−) magenta color particles 165b and black particles 166b are moved toward the first substrate 120.

Under this configuration, when light is incident from the outside, light of a green-blue color and a yellow color is reflected from the cyan color particles 165a and the yellow color particles 165c. This may allow a green color resulting from a mixture between the green-blue color and the yellow color to be displayed on the screen of the EPD device.

As illustrated in FIG. 4B, a negative voltage (−) is applied to the pixel electrodes 118b and 118c of the magenta and yellow sub-pixels, and a positive voltage (+) is applied to the pixel electrode 118a of the cyan sub-pixel. In this case, the positively charged (+) white particles 164b and 164c in the magenta sub-pixel and the yellow sub-pixel are moved toward the first substrate 120, and the negatively charged (−) magenta color particles 165b and yellow color particles 165c are moved toward the second substrate 140. At the same time, the positively charged (+) white particles 164a in the cyan sub-pixel are moved toward the second substrate 140, and the negatively charged (−) cyan color particles 165a are moved toward the first substrate 120.

Under this configuration, when light is incident from the outside, light of a dark reddish-purple color and a yellow color is reflected from the magenta color particles 165b and the yellow color particles 165c. This may allow a red color resulting from a mixture between the dark reddish-purple color and the yellow color to be displayed on the screen of the EPD device.

As illustrated in FIG. 4C, a negative voltage (−) is applied to the pixel electrodes 118a and 118b of the cyan and magenta sub-pixels, and a positive voltage (+) is applied to the pixel electrode 118c of the yellow sub-pixel. In this case, the positively charged (+) white particles 164a and 164b in the cyan and magenta sub-pixels are moved toward the first substrate 120, and the negatively charged (−) cyan color particles 165a and magenta color particles 165b are moved toward the second substrate 140. At the same time, the positively charged (+) white particles 164c in the yellow sub-pixel are moved toward the second substrate 140, and the negatively charged (−) yellow color particles 165c and black particles 166c are moved toward the first substrate 120.

Under this configuration, when light is incident from the outside, light of a green-blue color and a dark reddish-purple color is reflected from the cyan color particles 165a and the magenta color particles 165b. This may allow a blue color resulting from a mixture between the green-blue color and the dark reddish-purple color to be displayed on the screen of the EPD device.

As aforementioned, in the present invention, colors are displayed by forming the electrophoretic layer 160 with an electrophoretic material including the white particles 164, the black particles 166 and the color particles 165, and by combining the light reflected from the color particles 165 with each other. This allows various colors to be displayed on the screen without a color filter layer. Accordingly, light absorption by the color filter layer included in the EPD device according to the related art may not occur, and an EPD device of the present invention is thus able to display color images with a high brightness.

In the present invention, each sub-pixel includes the black particles 166. Accordingly, a black color may be displayed with a higher clarity (e.g., visibility) by absorbing some parts of the light reflected from the cyan color particles 165a, the magenta color particles 165b and the yellow color particles 165c.

In the aforementioned embodiment, colors are implemented by the cyan color particles 165a, the magenta color particles 165b and the yellow color particles 165c. However, colors may be also implemented by RGB color particles.

As aforementioned, in the present invention, black and white colors are implemented by driving black particles, white particles or color particles, and a desired color can be implemented by driving color particles.

Hereinafter, a method for fabricating an EPD device according to the present invention will be explained.

FIGS. 5A to 5G are views illustrating a method for fabricating an EPD device according to the first embodiment of the present invention.

Figure 5A:
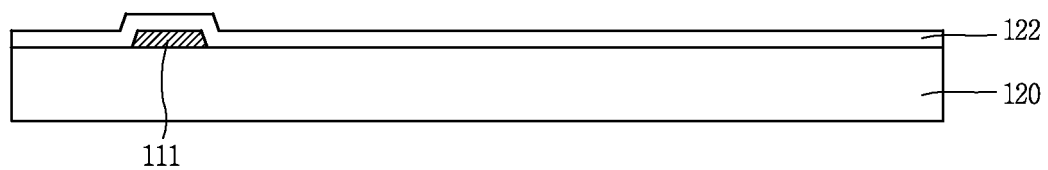
FIGS. 5A to 5G are views illustrating a method for fabricating an electrophoretic display device according to the first embodiment of the present invention.

As illustrated in FIG. 5A, an opaque metallic material having an excellent conductivity, such as Cr, Mo, Ta, Cu, Ti, Al and Al alloy, is deposited by a sputtering process on a first substrate 120 formed of a transparent material such as glass and plastic. Then, the opaque metallic material is etched by a photolithography process, thereby forming a gate electrode 111. Then, an inorganic insulation material such as $SiO_2$ or SiNx is deposited by a chemical vapor deposition (CVD) process on the entire surface of the first substrate 120 where the gate electrode 111 has been formed, thereby forming a gate insulation layer 122.

Figure 5B:
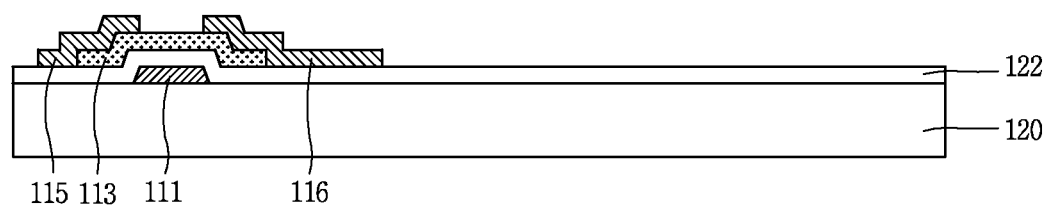

As illustrated in FIG. 5B, a semiconductor material such as amorphous silicon (a-Si) is deposited on the entire surface of the first substrate 120 by a CVD process, and is then etched, thereby forming a semiconductor layer 113. Although not shown, impurities are partially doped on the semiconductor layer 113, or impurities-included amorphous silicon is deposited on the semiconductor layer 113, thereby forming an ohmic contact layer for ohmic-contacting source and drain electrodes to be later formed to the semiconductor layer 113.

Figure 5C:
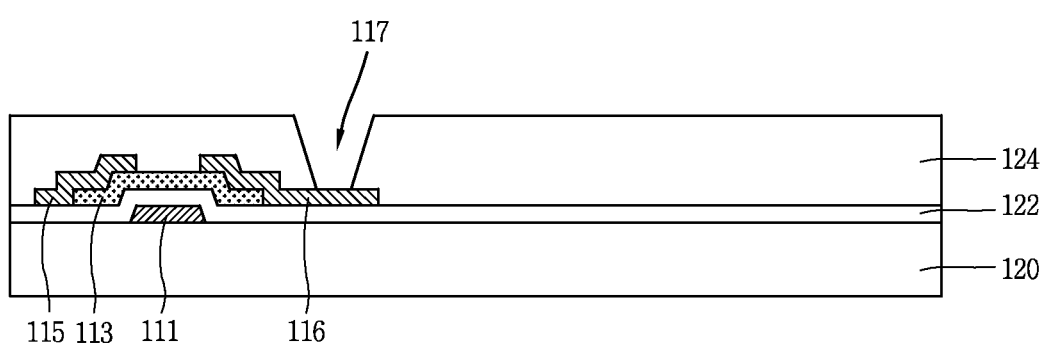

As illustrated in FIG. 5C, an opaque metallic material having an excellent conductivity, such as Cr, Mo, Ta, Cu, Ti, Al and Al alloy, is deposited on the first substrate 120 by a sputtering method, and is then etched, thereby forming a source electrode 115 and a drain electrode 116 on the semiconductor layer 113 with the ohmic contact layer therebetween. Then, an organic insulation material such as BCB (Benzo Cyclo Butene) or photo acryl is deposited on the entire surface of the first substrate 120 where the source electrode 115 and the drain electrode 116 have been formed, thereby forming a passivation layer 124.

Although not shown, the passivation layer 124 may be implemented as a plurality of layers. For instance, the passivation layer 124 may be implemented as a double layer consisting of an organic insulation layer formed of an organic insulation material such as BCB or photo acryl, and an inorganic insulation layer formed of an inorganic insulation material such as $SiO_2$ or SiNx. Alternatively, the passivation layer 124 may be implemented as a plurality of layers including an inorganic insulation layer, an organic insulation layer and an inorganic insulation layer. The passivation layer 124 may have a flat surface when formed of the organic insulation layer, and may have an enhanced interface characteristic when formed of the inorganic insulation layer.

A contact hole 117 is formed in the passivation layer 124, thereby exposing the drain electrode 116 of the thin film transistor to the outside.

Figure 5D:
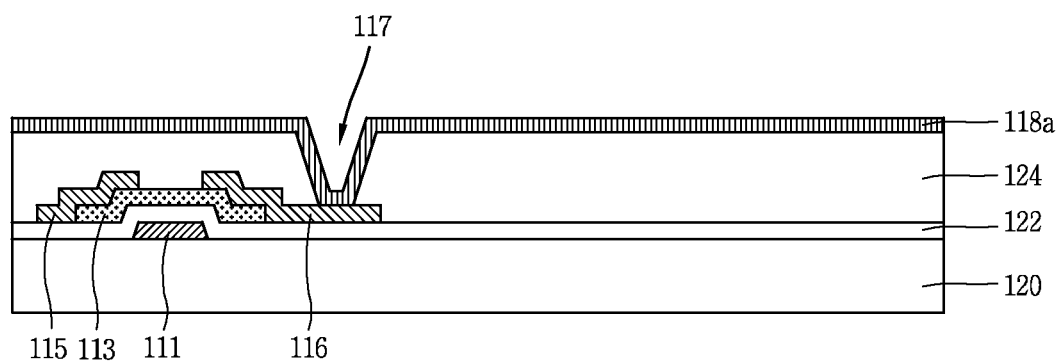

As illustrated in FIG. 5D, a transparent conductive material such as ITO (Indium Tin Oxide) or IZO (Indium Zinc Oxide) is deposited on the passivation layer 124, thereby forming a transparent conductive layer 118a electrically connected to the drain electrode 116 of the TFT through the contact hole 117.

Figure 5E:
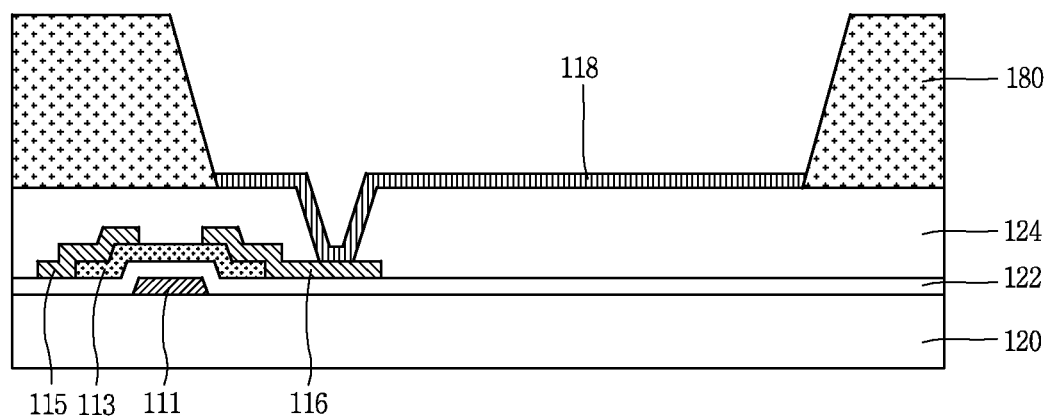

As illustrated in FIG. 5E, the transparent conductive layer 118a is patterned, thereby forming a pixel electrode 118 in each sub-pixel. Then, a partition wall 180 is formed between the sub-pixels on the passivation layer 124. The partition wall 180 may be formed by depositing an insulation layer formed of resin or the like and then by etching the insulation layer by a photolithography process using a photoresist. Alternatively, the partition wall 180 may be formed by depositing a photosensitive resin and then by etching the photosensitive resin by a photolithography process.

Alternatively, the partition wall 180 may be formed to have a pattern by a printing method using a printing roll. The partition wall 180 may be formed by fabricating a mold having a corresponding groove and then by transferring an insulation material of the mold onto the first substrate 120. The partition wall 180 may also be formed by an imprint method. The aforementioned methods are merely exemplary, and the present invention is not limited to these methods. That is, the partition wall 180 may be formed by various types of methods well known in the industry.

In FIG. 5, the partition wall 180 is formed on the passivation layer 124 after the pixel electrode 118 has been formed on the passivation layer 124. However, the pixel electrode 118 may be formed in each sub-pixel after the partition wall 180 which defines sub-pixels has been formed on the passivation layer 124. Here, the passivation layer 124 and the partition wall 180 may be simultaneously formed with the same material. For instance, the passivation layer 124 may be formed to have a higher thickness, and then may be patterned by using a diffraction mask or a half-tone mask, thereby simultaneously forming the partition wall 180 and the contact hole 117. Alternatively, the partition wall 180 may be formed by forming concave-convex portions by partially removing the passivation layer with using a mold or the like.

Figure 5F:
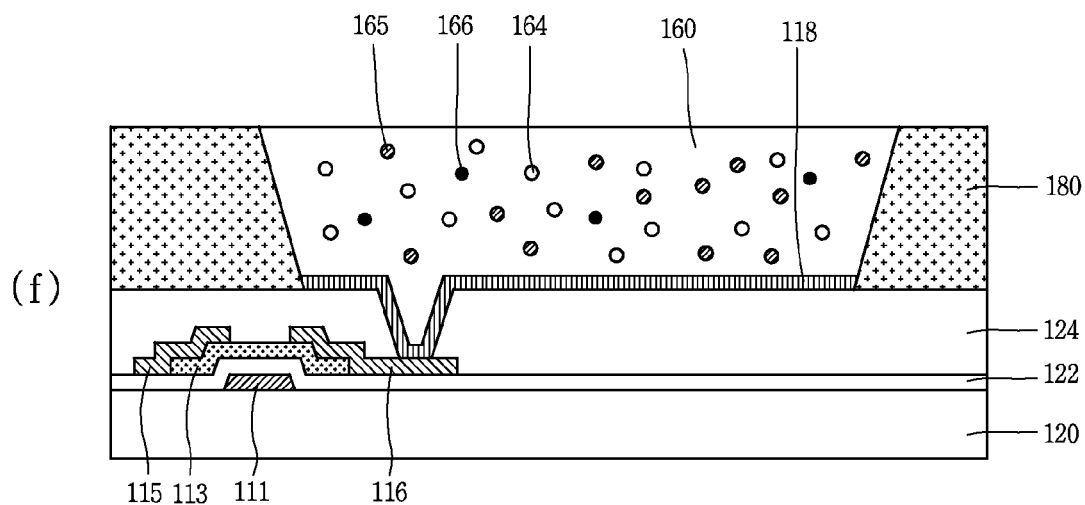

As illustrated in FIG. 5F, an electrophoretic material is filled in each sub-pixel inside the partition wall 180. The electrophoretic material includes positively charged and negatively charged particles, and is filled in sub-pixels together with a dispersive medium. In the preferred embodiment, an electrophoretic material filled in sub-pixels together with the dispersive medium with a predetermined volume is defined as an electrophoretic layer. Here, the particles include the white particles 164, the black particles 166 and the color particles 165. The color particles 165 may be implemented as color particles of cyan, magenta and yellow, or color particles of red, green and blue (RGB).

The dispersive medium may be a black liquid polymer. As another example, the electrophoretic layer may be formed of air, white particles, black particles and color particles, without using a liquid polymer. Here, the white particles, the black particles and the color particles are distributed on the electrophoretic layer 160 in the air, and are moved in the electrophoretic layer 160 by an applied voltage.

The white particles 164 are particles having an excellent reflectivity such as $TiO_2$. The black particles 165 are particles having a black characteristic such as carbon black. The color particles may be made of pigments or dyes.

The white particles 164 may be negatively charged, whereas the color particles 165 and the black particles 166 may be positively charged. Alternatively, the white particles 164 may be positively charged, and the color particles 165 and the black particles 166 may be negatively and positively charged.

The electrophoretic material may be filled in the sub-pixels defined by the partition wall 180 in a various manner. Hereinafter, a method for filling an electrophoretic material will be explained.

Figure 6A:
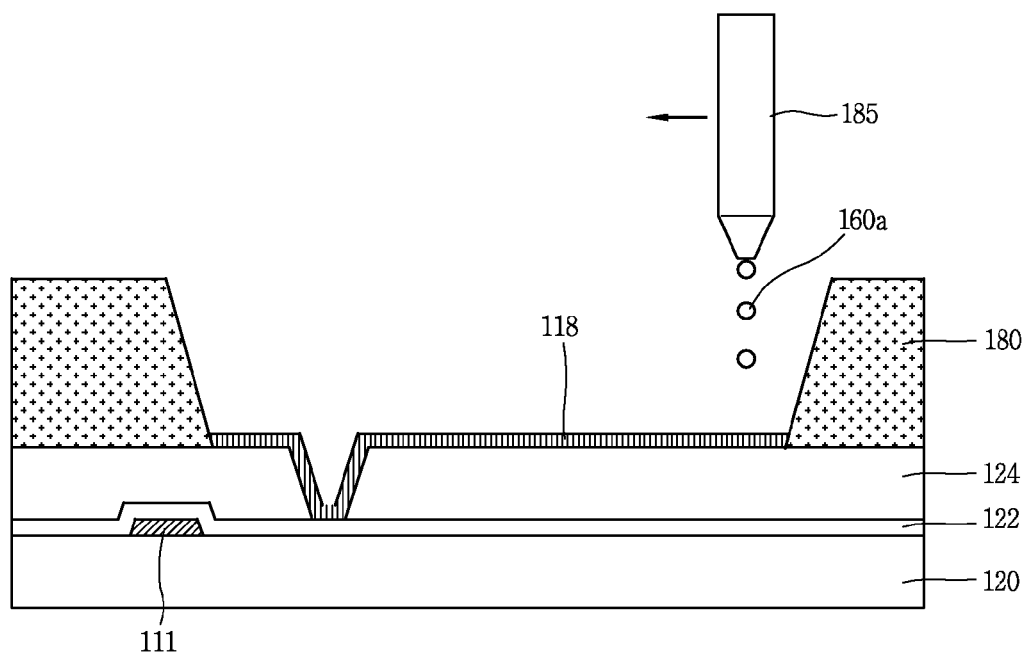
FIGS. 6A and 6B are views illustrating a method for forming an electrophoretic layer of an electrophoretic display device according to the first embodiment of the present invention.
Figure 6B:
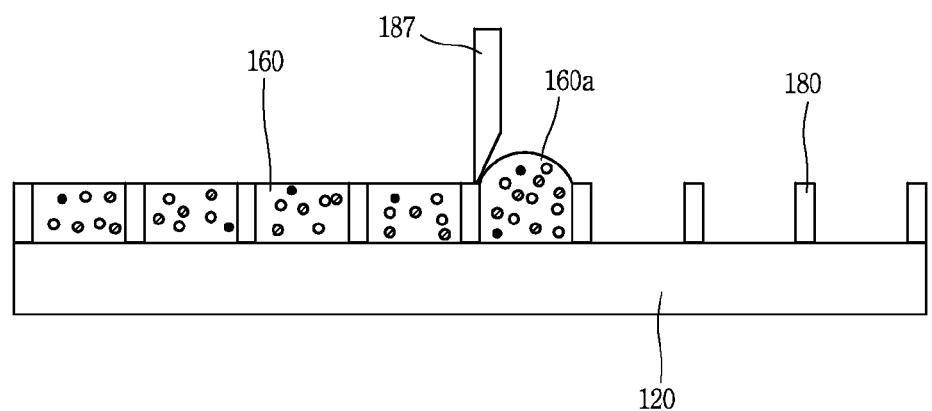

FIGS. 6A and 6B are views illustrating a method for forming the electrophoretic layer 160 by filling an electrophoretic material in each sub-pixel formed on the first substrate 120 according to the present invention.

FIG. 6A is a view illustrating a method for forming the electrophoretic layer 160 in an ink jet manner or a nozzle manner. As illustrated in FIG. 6A, an electrophoretic material 160a is filled in a syringe (or nozzle) 185 together with a dispersive medium. Then, the syringe 185 is positioned above the first substrate 120 where the electrohoretic layer is to be formed. Then, the electrophoretic material 160a is filled in the sub-pixels thus to form the electrophoretic layer 160 by applying a pressure to the syringe 185 from an external air supplying device (not shown).

Although not shown, in order to fill the electrophoretic material 160a in each of the sub-pixels, the electrophoretic material 160a includes color particles, white particles and black particles in correspondence to each of the sub-pixels.

FIG. 6B is a view illustrating a method for forming the electrophoretic layer 160 in a squeeze manner. Referring to FIG. 6B, the electrophoretic material 160a is deposited on the first substrate 120 having a plurality of partition walls 180 formed thereon, together with a dispersive medium. Then, the electrophoretic material 160a is moved on the first substrate 120 by a squeeze bar 187. Herein, the electrophoretic material 160a is filled in the partition walls 180 by a pressure of the squeeze bar 187, thereby forming the electrophoretic layer 160.

Although not shown, when filling the electrophoretic material 160a including specific color particles, sub-pixels in which other color particles are to be filled are blocked by a photoresist or the like. Then, the electrophoretic material 160a is filled in a corresponding pixel in a squeeze manner.

The above methods are merely exemplary methods for forming the electrophoretic layer 160 according to the present invention. The present invention is not limited to the above methods. For example, the present invention may be applied to various methods such as a casting print method, a bar coating print method, a screen print method and a mold print method.

Figure 5G:
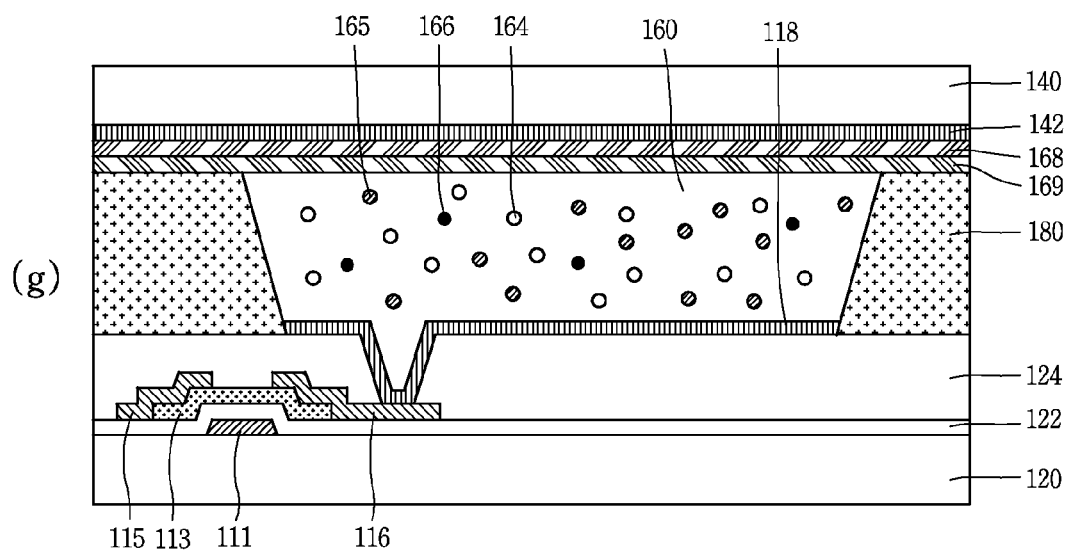

As illustrated in FIG. 5G, a sealant is deposited on the first substrate 120, especially on a display region, thereby forming a sealing layer 168. Then, the first substrate 120 is attached to the second substrate 140, thereby completing an EPD device.

The sealing layer 168 may prevent an electrophoretic material and a dispersive medium filled in one sub-pixel from flowing to adjacent sub-pixels. Also, the sealing layer 168 may prevent moisture from being introduced into the electrophoretic layer 160, thereby preventing deterioration of the electrophoretic layer 160.

The sealing layer 168 may not be formed on an upper surface of the electrophoretic layer 160, but may be formed only on an upper region of the partition wall 180. Owing to the sealing layer 168 formed on an upper surface of the partition wall 180, the first substrate 120 and the second substrate 140 are attached to each other with a sealed state therebetween. That is, the sub-pixels are sealed by the second substrate and the sealing layer.

In the drawings, the first substrate 120 and the second substrate 140 are attached to each other by the sealing layer 168. However, an adhesive layer may be further formed so as to enhance an adhesive strength between the first substrate 120 and the second substrate 140. The adhesive layer may be formed only on the sealing layer 168 disposed on an upper surface of the partition wall 180. Alternatively, the adhesive layer may be formed on both the electrophoretic layer 160 and the sealing layer 168.

After filling the electrophoretic layer in each of the sub-pixels, an interlayer 169 for preventing the electrophoretic layer from directly contacting the sealing layer may be further formed on an upper surface of the electrophoretic layer. The interlayer 169 may be formed of Methyl Ethyl Ketone. The interlayer 169 is coated on the electrophoretic layer with a thickness of several nano meters. The interlayer 169 may prevent a direct contact between the electrophoretic layer and the sealing layer, thereby preventing electrophoretic particles from being adhered to the sealing layer. This may prevent the occurrence of deteriorated pixels caused by an adhesion of electrophoretic particles to the sealing layer.

A common electrode 142 is formed on the second substrate 140 formed of a transparent material such as glass and plastic. The common electrode 142 is formed by depositing a transparent conductive material such as ITO and IZO.

As aforementioned, in the method for fabricating an EPD device according to the present invention, the partition wall 180 is directly formed on the first substrate 120, and the electrophoretic layer 160 is filled between the partition walls 180 of the first substrate 120. Under this configuration, the electrophoretic layer 160 is directly formed on the pixel electrode 118 thus to directly come in contact with the pixel electrode 118. Accordingly, differently from the EPD device according to the related art, an additional adhesive layer for attaching the electrophoretic layer 160 to the pixel electrode 118 and the passivation layer 124 is not required. This may simplify the fabrication processes and reduce the fabrication costs.

Furthermore, in the present invention, a desired color may be implemented by directly reflecting the incident light using color particles. This may minimize an optical loss due to a color filter layer, thereby enhancing a brightness of a displayed color. Besides, in the present invention, a black color is implemented by color particles and black particles. The black particles absorb the light. This may allow a black color to be displayed with a higher clarity.

Figure 7A:
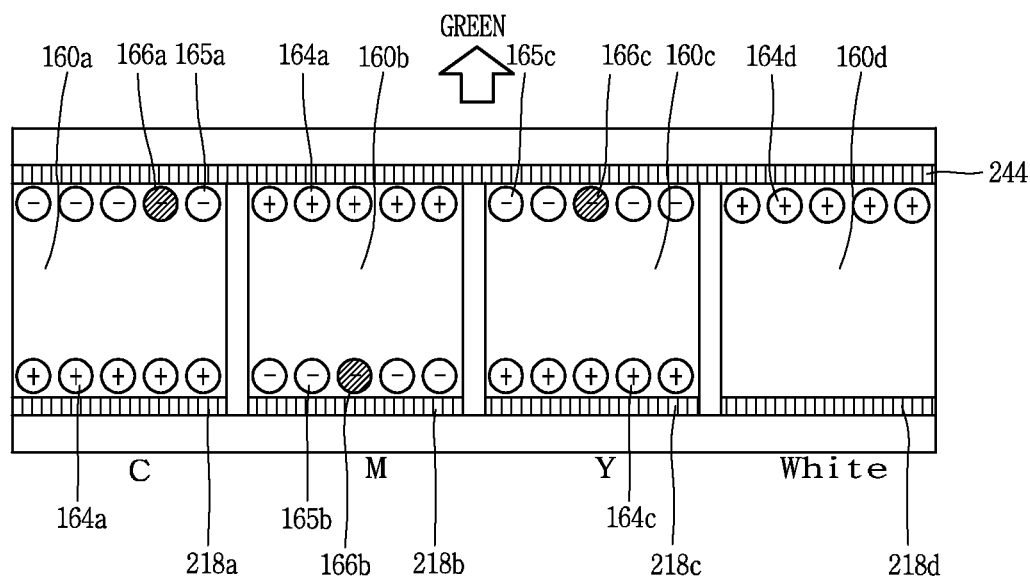
FIGS. 7A and 7B are views illustrating a method for implementing colors on an electrophoretic display device according to the second embodiment of the present invention.
Figure 7B:
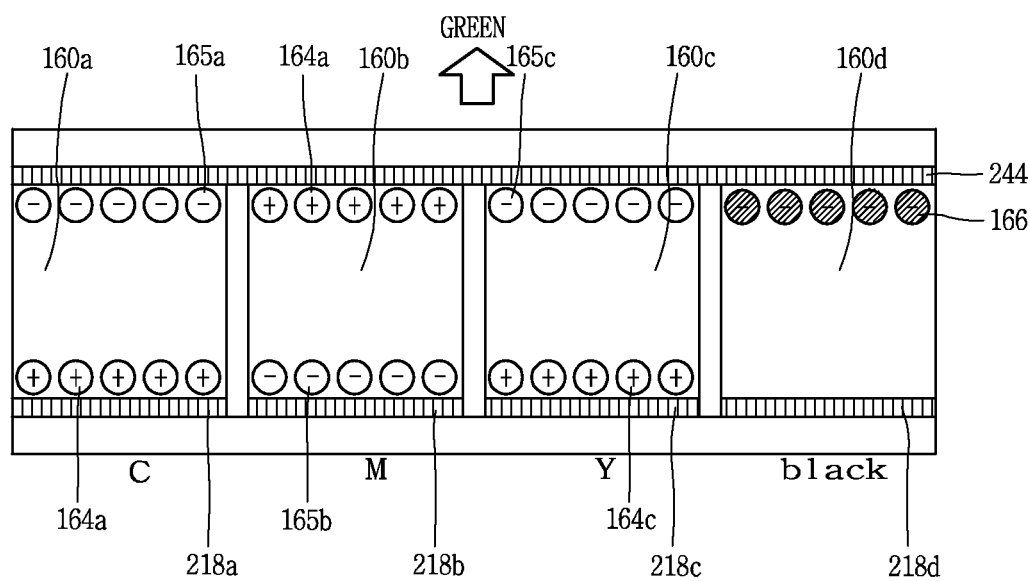

FIGS. 7A and 7B are views illustrating a method for implementing colors on an electrophoretic display device according to the second embodiment of the present invention.

In this embodiment, the pixel includes four sub-pixels having the cyan sub-pixel, the magenta sub-pixel, the yellow sub-pixel, and a white sub-pixel or four sub-pixels having the cyan sub-pixel, the magenta sub-pixel, the yellow sub-pixel, and a black sub-pixel. The white sub-pixel improves the brightness of the EPD device and the black sub-pixel improves the contrast ratio of the EPD device.

As shown in FIG. 7A, the EPD device includes having the cyan sub-pixel, the magenta sub-pixel, the yellow sub-pixel, and a white sub-pixel. In the cyan sub-pixel C, the magenta sub-pixel M, and the yellow sub-pixel Y, the cyan color particles 165a, the magenta particles 165b, the yellow particles 165c, the black particles 166a,166b,166c, and the white particles 164a,164b,164c are respectively filled. In the white sub-pixel, only the white particles 164d are filled.

The color particles 165a, 165c, 165c and the black particles 166a,166b,166c are negatively charged, whereas the white particles 164a,164b,164c,164d are positively charged. Alternatively, the white particles 164a, 164b, 164c, 164d may be negatively charged, whereas the color particles 165a, 165b, 165c and the black particles 166a, 166b, 166c may be positively charged.

In this embodiment, when the negative voltage (−) and the positive voltage (+) are applied to the common electrode 242 and the pixel electrodes 218a, 218b, 218c, the color particles 165a, 165c, 165c, the black particles 166a, 166b, 166c, and the white particles 164a, 164b, 164c, 164d are moving to the common electrode 242 or the pixel electrodes 218a, 218b, 218c to display color.

As shown in FIG. 7B, the EPD device includes having the cyan sub-pixel, the magenta sub-pixel, the yellow sub-pixel, and a black sub-pixel. In the cyan sub-pixel C, the magenta sub-pixel M, and the yellow sub-pixel Y, the cyan color particles 165a, the magenta particles 165b, the yellow particles 165c, and the white particles 164a,164b,164c are respectively filled. In the black sub-pixel, only the black particles 166 are filled. That is, in this structure, the black particles are not introduced in the cyan sub-pixel, the magenta sub-pixel, the yellow sub-pixel. At this time, the amount of the black particles 166 of the black pixel shown in FIG. 7B can be the same as the total amount of the black particles 166a, 166b, 166c of the cyan sub-pixel C, the magenta sub-pixel M, and the yellow sub-pixel Y shown in FIG. 7B.

The color particles 165a, 165c, 165c and the black particles 166 are negatively charged, whereas the white particles 164a, 164b,164c are positively charged. Alternatively, the white particles 164a, 164b, 164c may be negatively charged, whereas the color particles 165a, 165b, 165c and the black particles 166 may be positively charged.

The EPD display displays the red color, the green color, and the blue color by mixing the light from the cyan sub-pixel C, the magenta sub-pixel M, and the yellow sub-pixel Y. In this embodiment, a method of displaying only one color, e.g., a green color, is disclosed for convenience.

As shown in FIG. 7A, a negative voltage (−) is applied to the pixel electrodes 218a and 218c of the cyan and yellow sub-pixels, and a positive voltage (+) is applied to the pixel electrodes 218b and 218d of the magenta and white sub-pixels. In this case, the positively charged (+) white particles 164a and 164c in the cyan sub-pixel and the yellow sub-pixel are moved toward the first substrate 120, and the negatively charged (−) cyan color particles 165a, yellow color particles 165c, and black particles 166a and 166c are moved toward the second substrate 140. At the same time, the positively charged (+) white particles 164b and 166d in the magenta sub-pixel and the with sub-pixel are moved toward the second substrate 140, and the negatively charged (−) magenta color particles 165b and black particles 166b are moved toward the first substrate 120.

Under this configuration, when light is incident from the outside, light of a green-blue color and a yellow color is reflected from the cyan color particles 165a and the yellow color particles 165c. This may allow a green color resulting from a mixture between the green-blue color and the yellow color to be displayed on the screen of the EPD device. Further, the light incident to the white sub-pixel and the magenta sub-pixel from the outside is reflected from the white particles 164b and 164d.

In the three sub-pixel EPD device as shown in FIG. 4A, only the white light is reflected from only the magenta sub-pixel. In this embodiment, however, since the white light is reflected from the magenta sub-pixel and the white sub-pixel, the brightness can be improved as compared to the three sub-pixel EPD device as shown in FIG. 4A.

As shown in FIG. 7B, a negative voltage (−) is applied to the pixel electrodes 218a, 218c, and 218d of the cyan sub-pixel, the yellow sub-pixel, and the black sub-pixel, and a positive voltage (+) is applied to the pixel electrodes 218b of the magenta sub-pixel. In this case, the positively charged (+) white particles 164a and 164c in the cyan sub-pixel and the yellow sub-pixel are moved toward the first substrate 120, and the negatively charged (−) cyan color particles 165a, yellow color particles 165c, and black particles 166 are moved toward the second substrate 140. At the same time, the positively charged (+) white particles 164b and 166d in the magenta sub-pixel and the with sub-pixel are moved toward the second substrate 140, and the negatively charged (−) magenta color particles 165b are moved toward the first substrate 120.

Under this configuration, when light is incident from the outside, light of a green-blue color and a yellow color is reflected from the cyan color particles 165a and the yellow color particles 165c. This may allow a green color resulting from a mixture between the green-blue color and the yellow color to be displayed on the screen of the EPD device. Further, the light incident to the magenta sub-pixel from the outside is reflected from the white particles 164b and the light incident to the black sub-pixel from the outside is absorbed by the black particles 166.

In this EPD device, since the light incident to the black pixel from the outside is absorbed by the black particles 166, the contrast ratio of EPD device may be improved. At that time, the amount of the black particles 166 in the black sub-pixel can be varied to control the contrast ratio of the EPD device.

In the aforementioned embodiments, specific structures of the EPD device are explained. However, an EPD device of the present invention is not limited to the specific structures. For example, various types of electrophoretic layers may be applied to the electrophoretic layer. That is, all types of electrophoretic layers which may be formed on the first substrate may be applied to the electrophoretic layer.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An electrophoretic display (EPD) device comprising:
   first and second substrates having a plurality of unit pixels, each unit pixel including three sub-pixels;
   a thin film transistor in each sub-pixel on the first substrate;
   a pixel electrode connected to a drain electrode of the thin film transistor;
   an electrophoretic layer on the pixel electrode, the electrophoretic layer including white charged particles, black charged particles and color charged particles; and
   a common electrode on the second substrate,
   wherein the color charged particles and the black charged particles have the same polarity, and wherein the white charged particles have a different polarity from the polarity of the black and color charged particles.

2. The EPD device according to claim 1, wherein the color charged particles are either one of cyan, magenta and yellow color particles or one of red, green and blue color particles.

3. The EPD device according to claim 1, further comprising a partition wall between the sub-pixels substantially surrounding the pixel electrode in each sub-pixel.

4. The EPD device according to claim 3, wherein the partition wall includes a photosensitive organic material.

5. The EPD device according to claim 3, further comprising an interlayer on the electrophoretic layer and a sealing layer on the interlayer.

6. The EPD device according to claim 5, wherein the interlayer includes Methyl Ethyl Ketone.

7. The EPD device according to claim 3, further comprising a sealing layer on the partition wall, wherein the sealing layer is not formed on the electrophoretic layer.

8. The EPD device according to claim 1, wherein a volume ratio of the black charged particles is in a range of 0.01-50 Vol. % in reference to the color charged particles in each sub-pixel.

9. The EPD device according to claim 1, wherein a volume ratio of the black charged particles is in a range of 0.03-30 Vol. % in reference to the color charged particles in each sub-pixel.

10. A method of manufacturing an electrophoretic display (EPD) device, the EPD device having a plurality of unit pixels, each unit pixel including three sub-pixels, the method comprising:
    forming a thin film transistor in each sub-pixel on a first substrate;
    forming a passivation layer on the thin film transistor;
    forming a contact hole in the passivation layer;
    forming a pixel electrode on the passivation layer, the pixel electrode being connected to a drain electrode of the thin film transistor via the contact hole;
    forming a partition wall between the sub-pixels, the partition wall substantially surrounding the pixel electrode in each sub-pixel;
    forming an electrophoretic layer on the pixel electrode, the electrophoretic layer including white charged particles, black charged particles and color charged particles; and
    attaching the first substrate to a second substrate,
    wherein the color charged particles and the black charged particles have the same polarity, and wherein the white charged particles have a different polarity from the polarity of the black and color charged particles.

11. The method according to claim 10, wherein the contact hole and the partition wall are simultaneously formed by patterning the passivation layer using a half-tone mask or a diffractive mask.

12. The method according to claim 10, wherein the passivation layer includes organic insulating material.

13. The method according to claim 10, wherein the partition wall includes a photosensitive organic material.

14. The method according to claim 10, wherein the partition wall is formed by a printing method, a photolithography or a mold patterning method.

15. The method according to claim 10, wherein the white charged particles include a metal oxide and the black charged particles include carbon.

16. The method according to claim 10, wherein the electrophoretic layer is formed by a dispensing method, an ink-jet method, a squeeze method or a printing method.

17. The method according to claim 10, wherein the first and second substrates are attached to each other through a sealing layer on the partition wall.

18. The method according to claim 10, further comprising forming an interlayer on the electrophoretic layer.

19. The method according to claim 18, wherein the interlayer includes Methyl Ethyl Ketone.

20. The method according to claim 10, wherein the color charged particles are either one of cyan, magenta and yellow color particles or one of red, green and blue color particles.

21. The method according to claim 10, wherein a volume ratio of the black charged particles is in a range of 0.01-50 Vol. % in reference to the color charged particles in each sub-pixel.

22. The method according to claim 10, wherein a volume ratio of the black charged particles is in a range of 0.03-30 Vol. % in reference to the color charged particles in each sub-pixel.

23. An electrophoretic display (EPD) device comprising:
first and second substrates having a plurality of unit pixels, each unit pixel including four sub-pixels;
a thin film transistor in each sub-pixel on the first substrate;
a pixel electrode connected to a drain electrode of the thin film transistor;
a partition wall between the sub-pixels substantially surrounding the pixel electrode in each sub-pixel;
an electrophoretic layer on the pixel electrode, wherein each electrophoretic layer in three of the four sub-pixels includes white charged particles and color charged particles, and wherein the electrophoretic layer in the fourth sub-pixel includes either the white charged particles or black charged particles; and
a common electrode on the second substrate,
wherein the color charged particles and black charged particles have the same polarity, and wherein the white charged particles have a different polarity from the polarity of the black and color charged particles.

24. The EPD device according to claim 23, wherein each electrophoretic layer in the three sub-pixels further includes the black charged particles.

25. The EPD device according to claim 24, wherein a volume ratio of the black charged particles is in a range of 0.03-30 Vol. % in reference to the color charged particles in one of the three sub-pixels.

26. The EPD device according to claim 23, wherein a volume ratio of the black charged particles in the fourth sub-pixel is in a range of 0.03-30 Vol. % in reference to sum of the color charged particles in the three sub-pixel.

27. The EPD device according to claim 23, wherein the color charged particles are either one of cyan, magenta and yellow color particles or one of red, green and blue color particles.

* * * * *